Patented Feb. 5, 1952

2,584,342

UNITED STATES PATENT OFFICE 2,584,342

REACTING SILOXANE-GLYCERINE ESTER WITH ACID ESTER OF DICARBOXYLIC ACID AND GLYCERINE

John T. Goodwin, Jr., and Melvin J. Hunter, Midland, Mich., assignors to Dow Corning Corporation, Midland, Mich., a corporation of Michigan No Drawing. Application January 7, 1950, Serial No. 137,473

2 Claims. (Cl. 260—45.4)

This invention relates to resinous thermosetting compositions of matter.

The copending application of Melvin J. Hunter et al., Serial No. 59,414, filed November 10, 1948, discloses and claims resin compositions prepared by reacting a silane of the formula $R_nSiX_{4-n}$ with a polyhydric alcohol and thereafter reacting the product with a polybasic acid. Resins prepared in this manner are of great utility as coating compositions, such as for examples, paint vehicles and wire enamels. However, only a limited range of compositions can be prepared by this method, due to incompatibility.

It is an object of this invention to prepare resinous materials which combine exceptional heat stability and toughness to a degree heretofore unknown.

In accordance with this invention a polysiloxane containing from 0.9 to 2.1 silicon bonded monovalent hydrocarbon radicals per silicon atom and from .05 to 2 silicon bonded alkoxy or acyloxy radicals per silicon atom, the remaining valences of the silicon being satisfied by oxygen atoms of an SiOSi linkage, is reacted with glycerine to form a siloxane-glycerine ester, and the resulting product is thereafter reacted with an acid ester formed by reacting glycerine and a dicarboxylic acid or anhydride thereof in amount such that the ratio of the acid groups to glycerine OH is from 2.66:3 to 4:3.

The polysiloxanes employed in the method of this invention are the partial hydrolyzates of silanes of the type $R_nSiX_{4-n}$ where R is a saturated aliphatic radical of less than seven carbon atoms or a monocyclic aryl radical, and X is alkoxy or chlorine, and $n$ has a value from 0.9 to 2.1.

When silanes of the above type are reacted with water in amount less than that sufficient to hydrolyze all of the X radicals, a partially condensed siloxane still containing hydrolyzable groups is obtained. Such partial hydrolyzates may be prepared by a variety of ways, such as reacting alkoxy silanes with less than the theoretical amount of water, or as is preferred for the purpose of this invention, by reacting a chlorosilane with an alcohol to produce an alkoxychlorosilane and thereafter preferentially removing the chlorines by reacting the silane with water in amount equivalent to the chlorine present. This method is more fully set forth in the copending application of Lawrence A. Rauner, Serial No. 137,480, filed concurrently herewith.

In the above method the chlorines, being more reactive than the alkoxy radicals, are preferentially removed with the resulting condensation of the silane to form an alkoxylated siloxane. For the purposes of this invention the silicon bonded alkoxy groups in the partial hydrolyzate range from .05 to 2 alkoxy groups per silicon atom. Examples of such alkoxy groups are methoxy, ethoxy, butoxy and stearyloxy.

It has been found that it is often desirable to employ polysiloxanes having acyloxy groups in the place of or together with alkoxy radicals. Such acyloxy polysiloxanes are best prepared by reacting the corresponding alkoxy polysiloxanes with monocarboxylic acids. Reaction proceeds with the elimination of an alcohol and the replacement of the alkoxy radicals on the silicon with an acyloxy radical. Preferentially, the reaction is carried out at a temperature above the boiling point of the alcohol produced.

Resinous materials suitable for use as coating agents may be prepared from the above-defined polysiloxanes having any acyloxy group attached to the silicon. However, beneficial modifications of the resins, such as increased solubility in aromatic hydrocarbons, are obtained when acyloxy groups containing at least seven carbon atoms are employed. These include, for example, benzoyloxy, 2-ethylhexoyloxy, stearyloxy, and linoleyloxy. Thus, it can be seen that the hydrocarbon portion of the acyloxy group may be either monocyclic aryl, saturated aliphatic or unsaturated aliphatic.

The siloxanes employed herein have on the average from 0.9 to 2.1 saturated aliphatic hydrocarbon radicals containing less than seven carbon atoms or monocyclic aryl radicals per silicon atom. Examples of such radicals are methyl, ethyl, propyl, butyl, cyclohexyl, cyclopentyl, phenyl, tolyl, chlorophenyl, and xylyl. It is to be understood that any combination of the above-defined groups may be present in the siloxane.

The partially hydrolyzed polysiloxanes are usually mobile liquids in which the functional groups are alkoxy or acyloxy. These silanes are reacted with glycerine in amount such that the ratio of silicon bonded siloxane functional groups to glycerine OH is from 0.1:1 to 0.66:1.

When the polysiloxane and glycerine are mixed, reaction begins at once to produce a siloxane-glycerine ester. Reaction takes place at temperatures ranging from 30° C. up to 300° C., but the preferred range is from 100° C. to 210° C. Under the latter conditions any alcohol by-product is removed by distillation.

The acid esters employed in this invention are prepared by reacting glycerine with a dicarboxylic acid or anhydride thereof. Usually heating them at 140° C. to 150° C. for about one hour is sufficient. The molar ratio of acidic compound to glycerine is from 1.33 to 2. Thus, the acid esters always contain an excess of carboxyl groups which are free to react with the OH groups of the glyceryl-siloxane esters.

Theoretically, the acid esters employed herein respond to the formula

HOOCRCOOCH₂CHOHCH₂OOCRCOOH when the ratio of acid to glycerine is 2, and a mixture of the above and

HOOCRCOOCH₂CHOHCH₂OH when the molar ratio of acid to glycerine is between 1.33 and 2. The degree of polymerization of these esters is quite low, and they are not resinous in character.

Any carboxylic acid having the formula

HOOCRCOOH or anhydrides thereof may be employed in the process of this invention. In such acids R may be a divalent aryl or divalent aliphatic radical. Examples of such acids are phthalic, malonic, fumaric, and maleic.

The siloxane-glycerine ester is reacted with the acid ester in such amount that the ratio of the total glycerine OH to the sum of the siloxane functional groups plus the acid groups is from 0.9 to 1.2. Thus, it can be seen that the final resin may have either an excess of hydroxyl or an excess of carboxyls, or the various reactive groups may be balanced. In this invention the term "acid group" refers to carboxyl and anhydride groups, it being understood that each anhydride group is equivalent to two carboxyl groups.

The reaction between the glycerine-siloxane ester and the acid ester proceeds by condensation between the carboxyl or anhydride groups and the glycerine hydroxyls. This reaction is preferably carried out at temperatures ranging from 90° C. to 250° C. Under such conditions water is eliminated and the product condenses to a viscous, resinous state. Usually the condensation is continued until the product shows signs of gelling or wrapping around the agitator. At this stage the product is usually dissolved in a solvent for future use.

Any of the above steps may be carried out in the presence of a solvent such as aromatic hydrocarbons, alcohols, or ketones. However, the presence of a solvent is not essential.

The soluble resins prepared by the above manner are thermoset by further heating at temperatures up to 250° C. The cured resins make excellent coatings for high temperature uses.

The materials of this invention have thermal stabilities approaching those of straight siloxane resins. For example, metal panels have been coated with the resins and the film cured. This cured film showed no detectable deterioration after twenty-four hours' heating at 250° C. The thermal properties of the thermoset resins of this invention are such as to render the materials unique and able to meet specifications which are not satisfied by either organic resins, siloxane resins or other siloxane-modified organic resins.

The following examples are illustrative only.

*Example 1*

A mixture of 955 grams of phenylmethyldichlorosilane, 1057 grams of phenyltrichlorosilane and 748 grams of methyltrichlorosilane was treated with 1920 grams of isopropanol and maintained at a temperature of 30° C. to 35° C. until the evolution of HCl had ceased. The resulting material was then hydrolyzed by adding thereto 108 grams of water. During the addition of the water the temperature of the reaction mixture was maintained at from 30° C. to 35° C. The mixture was then heated to remove volatiles, and the resulting product was a mobile liquid which consisted of a partially hydrolyzed siloxane containing 0.8 isopropoxy groups per silicon atom and having a hydrocarbon radical to silicon ratio of 1.33.

272 grams of the above siloxane was mixed with 92 grams of anhydrous glycerine and heated at a temperature between 150° and 210° C. Isopropyl alcohol was removed. The ratio of isopropoxy groups to glycerine OH in the reaction mixture was .66. The resulting siloxane-glycerine ester was mixed with a glyceryl phthalate which had been prepared by reacting 92 grams of anhydrous glycerine with 296 grams of phthalic anhydride, and the mixture was heated at a temperature of about 170° C. to 210° C. Water was removed from the reaction mixture and heating was continued until the product began to wrap around the stirrer. The material was then dissolved in 648 grams of cyclohexanol.

*Example 2*

An alkoxylated siloxane was prepared in the manner of Example 1 except that 800 grams of isopropanol was employed. The resulting siloxane contained .33 isopropoxy groups per silicon atom.

407 grams of the siloxane was reacted with 69 grams of anhydrous glycerine at a temperature of about 170° C. Isopropyl alcohol distilled from the reaction mixture. The resulting siloxane-glycerine ester was then reacted with an acid ester prepared by heating 222 grams of phthalic anhydride with 69 grams of glycerine. The siloxane-glycerine ester and the acid ester were mixed and heated at a temperature up to 210° C. until the reaction mixture showed signs of gelation. During the reaction water was removed. The reaction mixture was dissolved in 689 grams of cyclohexanone, and the resulting solution was applied to the surface of copper and baked, whereupon a firmly adhering, heat stable coat was obtained.

*Example 3*

A siloxane was prepared according to the method of Example 1 by treating a mixture of 2290 grams of phenylmethyldichlorosilane and 1090 grams of phenyltrichlorosilane with 1070 grams of isopropanol. The resulting siloxane contained .67 isopropoxy radical per silicon and had a degree of substitution of 1.7 hydrocarbon radicals per silicon atom.

357 grams of this siloxane was reacted with 83 grams of anhydrous glycerine by heating a mixture of the two at a temperature of about 170° C. until substantially the theoretical amount of isopropyl alcohol had been removed.

The resulting siloxane-glycerine ester was reacted with an acid ester prepared by heating 60 grams of anhydrous glycerine with 200 grams of phthalic anhydride. The siloxane-glycerine ester and the acid ester were mixed and heated at a temperature up to 210° C. until the material showed signs of gelation. The resulting product was then dissolved in 600 grams of cyclohexanol, and the solution was applied to copper.

Upon baking the coated surface at 250° C., a firmly adhering coat was obtained.

Example 4

The procedure of Example 3 was repeated except that 55 grams of anhydrous glycerine was reacted with 357 grams of the alkoxylated siloxane. The resin obtained proved to be an excellent coating composition for metal surfaces.

Example 5

A siloxane containing .76 isopropyl group per silicon atom and having a degree of substitution of 1.7 phenyl and methyl groups per silicon atom was prepared in accordance with the method of Example 1. 272 grams of this siloxane was reacted with 74 grams of anhydrous glycerine at a temperature of about 170° C. After the theoretical amount of alcohol had been removed, the siloxane-glycerine ester was mixed with an acid ester prepared by reacting 92 grams of anhydrous glycerine with 296 grams of phthalic anhydride. The mixture was heated at a temperature up to 210° C. and water was evolved. Heating was continued until the reaction mixture began to wind about the stirrer, whereupon it was dissolved in 600 grams of cyclohexanone. The resulting solution was applied to copper and baked at 250° C., whereupon a hard, firmly adhering coat was obtained.

Example 6

278 grams of the siloxane of Example 5 was reacted with 92 grams of anhydrous glycerine and the resulting product was reacted with an acid ester prepared by reacting 92 grams of anhydrous glycerine with 296 grams of phthalic anhydride. The siloxane-glycerine ester and the acid ester were reacted as in the manner of Example 5, and the resulting resinous product proved to be an excellent coating composition for metal surfaces.

Example 7

A polysiloxane was prepared by reacting a mixture of 2290 grams of phenylmethyldichlorosilane and 1090 grams of phenyltrichlorosilane with 1070 grams of isopropanol and then with 230 grams of water, as is shown in Example 1. 236 grams of the resulting product was reacted with 120 grams of benzoic acid at a temperature of 150° C. Substantially the theoretical amount of isopropanol was removed, and the resulting product was a siloxane in which all of the isopropoxy radicals on the silicon had been replaced by benzoyl radicals. Thus, the product was a polysiloxane containing .67 benzoyloxy radical per silicon atom and 1.7 phenyl and methyl radicals per silicon atom.

This siloxane was reacted with 46 grams of glycerine and then with a glyceryl phthalate containing 148 grams of phthalic anhydride and 46 grams of glycerine, all of which procedure was carried out in accordance with the method of Example 1.

The resulting resin produced a hard, flexible, firmly adhering coat when baked on a tin surface at 200° C. for one hour.

That which is claimed is:

1. A method of preparing a resinous composition of matter which comprises reacting a polysiloxane containing from 0.9 to 2.1 silicon bonded monovalent hydrocarbon radicals per silicon atom, said radicals being selected from the group consisting of saturated aliphatic radicals of less than seven carbon atoms and monocyclic aryl radicals and said siloxane containing from .05 to 2 silicon bonded siloxane functional groups per silicon atom, said functional groups being selected from the group consisting of alkoxy and acyloxy radicals, said acyloxy radicals being of the formula RCOO— where R is a hydrocarbon radical, the remainder of the valences of the silicon being satisfied by oxygen atoms, with glycerine in amount such that the ratio of silicon bonded siloxane functional groups to OH is from 0.1:1 to 0.66:1, and thereafter reacting the siloxane-glycerine ester so formed with an acid ester formed by reacting an acidic compound selected from the group consisting of dicarboxylic acids and anhydrides thereof, with glycerine in amount such that the ratio of dicarboxylic acid groups to glycerine OH is from 2.66:3 to 4:3, said siloxane-glycerine ester and said acid ester being reacted in amount such that the ratio of the total glycerine hydroxyls to the sum of the silicon bonded siloxane functional groups plus the dicarboxylic acid groups is from 0.9:1 to 1.2:1.

2. The method in accordance with claim 1 wherein the monovalent hydrocarbon radicals are methyl and phenyl radicals.

JOHN T. GOODWIN, JR.
MELVIN J. HUNTER.

REFERENCES CITED

The following references are of record in the file of this patent:

UNITED STATES PATENTS

| Number | Name | Date |
|---|---|---|
| 2,386,793 | Hanford | Oct. 16, 1945 |
| 2,395,550 | Iler et al. | Feb. 26, 1946 |
| 2,426,121 | Rust et al. | Aug. 19, 1947 |
| 2,529,956 | Myles et al. | Dec. 14, 1950 |

FOREIGN PATENTS

| Number | Country | Date |
|---|---|---|
| 583,754 | Great Britain | Dec. 30, 1946 |